United States Patent [19]

Martin et al.

[11] 3,988,877
[45] Nov. 2, 1976

[54] ROW CROP HARVESTER

[75] Inventors: Virgil B. Martin; Dean E. Seefeld, both of West Bend, Wis.

[73] Assignee: Gehl Company, West Bend, Wis.

[22] Filed: June 4, 1975

[21] Appl. No.: 583,640

Related U.S. Application Data

[63] Continuation of Ser. No. 437,957, Jan. 30, 1974, abandoned.

[52] U.S. Cl. ................................ 56/11.6; 56/13.5; 56/98
[51] Int. Cl.² ...................................... A01D 73/00
[58] Field of Search ............. 56/119, 98, 13.5, 14.3, 56/14.5, 11.6, 16.6, 59, 66, 69, 73, 82, 88, 93; 74/242.8, 531

[56] References Cited
UNITED STATES PATENTS

| | | |
|---|---|---|
| 732,816 | 7/1903 | Bader.................................... 56/82 |
| 1,192,695 | 7/1916 | Smith.................................... 74/531 |
| 3,271,940 | 9/1966 | Ashton et al. ........................ 56/119 |
| 3,325,095 | 6/1967 | Mueller et al. .................... 74/242.8 |
| 3,736,733 | 11/1970 | Fell et al................................ 56/98 |
| 3,791,117 | 2/1974 | Lawrence ............................ 56/98 |

*Primary Examiner*—Louis G. Mancene
*Assistant Examiner*—James D. Hamilton
*Attorney, Agent, or Firm*—James E. Nilles

[57] ABSTRACT

A multiple row crop harvester is provided with two endless chain drives and associated endless belt conveyors for simultaneously handling the crop from all rows. Each endless chain drive comprises a number of chain sprockets at fixed radial spacings from each other, a chain tensioning idler, and an endless drive chain trained about the sprockets and idler. The idler of one chain drive and the idler of the other are operatively interconnected by a self-adjusting, one-way tensioning device.

9 Claims, 15 Drawing Figures

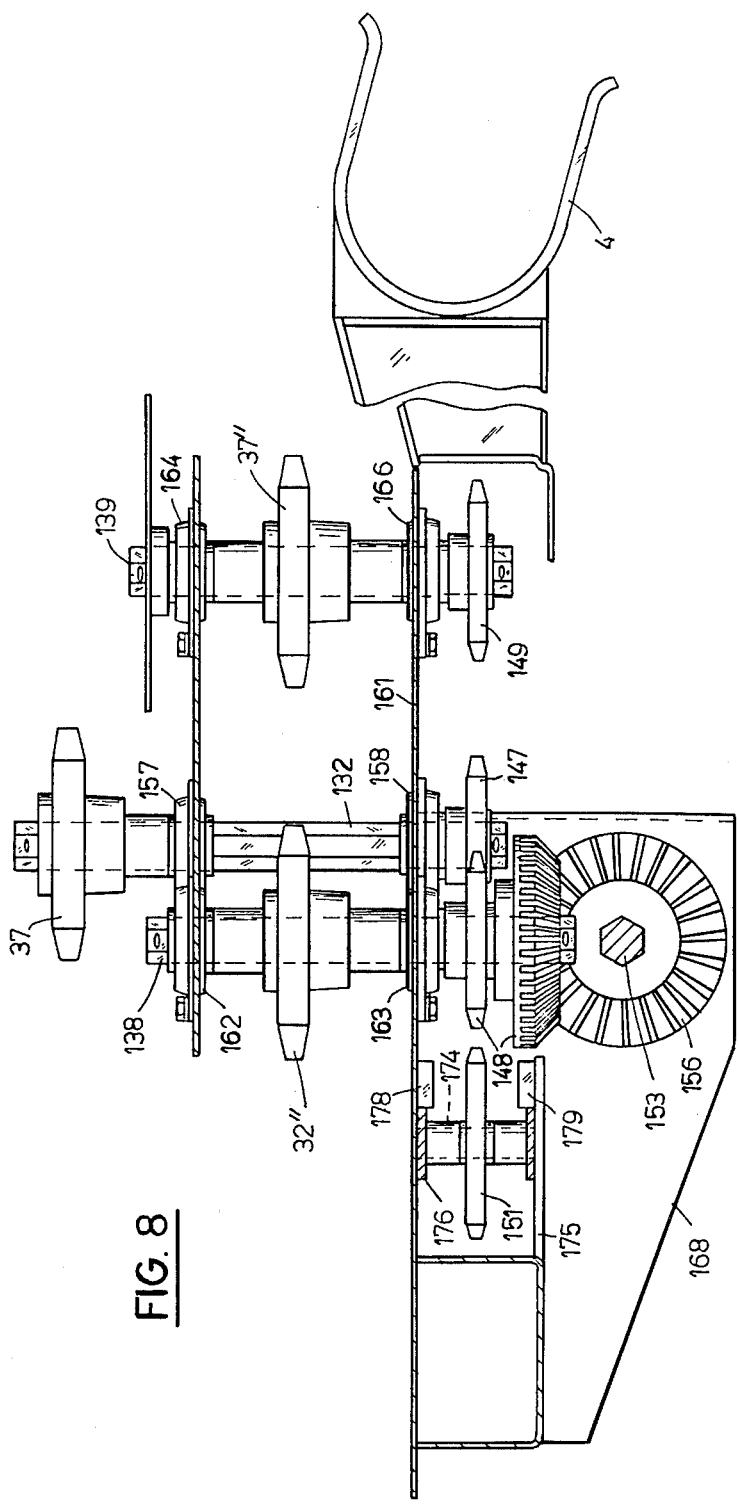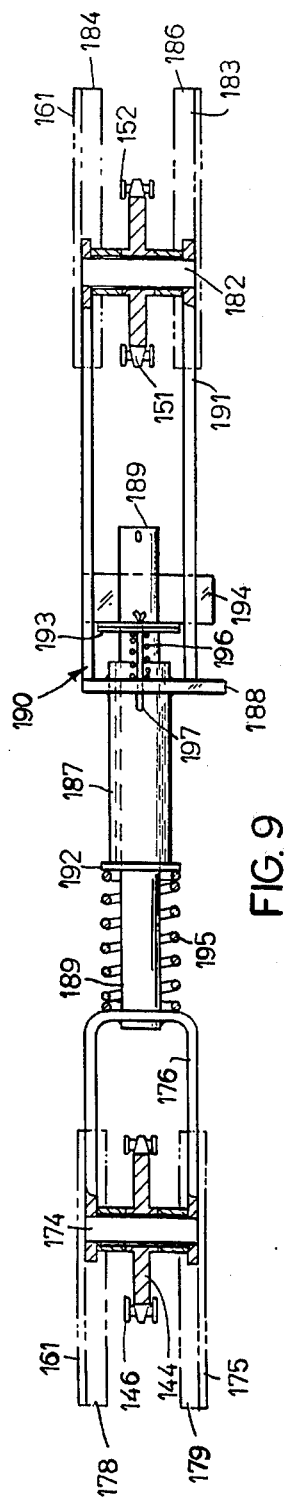
FIG. 8
FIG. 9

ROW CROP HARVESTER

This is a continuation of U.S. Pat. application Ser. No. 437,957, filed Jan. 30, 1974, now abandoned.

BACKGROUND OF THE INVENTION

The invention relates to the harvesting a row crops such as corn by means of tractor operated equipment. More particularly, the invention is concerned with the type of tractor operated harvesting equipment which severs the crop rows from the ground, and feeds them rearwardly for further processing, as for instance into a forage chopper.

Such row crop harvesting equipment as heretofore developed has been provided with a suitable mechanism for simultaneously severing a number of relatively adjacent crop rows from the ground and for moving the severed crop material along rearwardly and upwardly inclined feed passages into associated processing equipment. Pairs of endless conveyor belts have customarily been installed along the feed passages for moving the severed crop material therethrough. However, the mechanism for driving these conveyor belts, as heretofore developed, have not been entirely satisfactory, particularly in the matter of simplicity of construction, compactness and efficiency of operation.

SUMMARY OF THE INVENTION

The present invention provides an improved multiple row crop harvesting apparatus of the mentioned type which incorporates a greatly simplified mechanism for driving the crop feeding conveyor belts. The improved harvesting apparatus incorporates two endless chain drives and associated endless belt conveyors for simultaneously handling the crop from all rows. Each endless chain drive comprises a number of chain sprockets at fixed radial spacings from each other, a chain tensioning idler, and an endless drive chain trained about the sprockets and idler.

Both chain drives are connected to a single common power input shaft by gearing which causes the driving sprockets of the conveyor belts to rotate in crop feeding directions.

The two chain drives are tensioned by a mechanism which is common to both of these drives. To that end the idler of one chain drive and the idler of the other are operatively interconnected by a self-adjusting, one-way tensioning device.

More specifically, the invention provides an improved row crop harvester which incorporates three pairs of crop feeding endless conveyor belts, one central pair extending in the direction of propulsion of the apparatus, and the two other pairs extending at the opposite sides, respectively, of the central pair. Each of the conveyor belts is trained about an associated pair of front idler and rear driving sprockets. The driving sprocket for one of the central conveyor belts is connected by a chain and sprocket drive with both driving sprockets for the lateral pair of conveyor belts next to said one central belt; and the driving sprocket for the other central conveyor belt is connected by another chain and sprocket drive with both driving sprockets for the lateral pair of endless conveyor belts next to said other central belt.

Another feature of the invention is the mounting of the rear drive sprockets for the central pair of conveyor belts at a higher level than the rear drive sprockets of the adjacent lateral belt conveyors; and the overlapping of the rear loops of the central conveyor belts with the rear loops of the adjacent lateral conveyor belts.

Other features of the improved harvester are that the driving mechanism is sturdy and compact, efficient in operation, free from undue wear under severe operating conditions, and that is may be manufactured at relatively low costs. These features are of particular advantage in a multiple crop row feeding attachement, say a three-row attachement, where simplicity and compactness of design are extremely important from a performance and marketing standpoint.

THE DRAWINGS

The foregoing and other features and advantages of the invention will become more fully apparent as this disclosure proceeds with reference to the accompanying drawings wherein:

FIG. 8 is a simplified sectional view taken along line 8—8 in FIG. 7;

FIG. 9 is a sectional view on line 9—9 in FIG. 7;

FIG. 14 is an enlarged section on line 14—14 of FIG. 11; and

DETAILED DESCRIPTION

Figure 1:
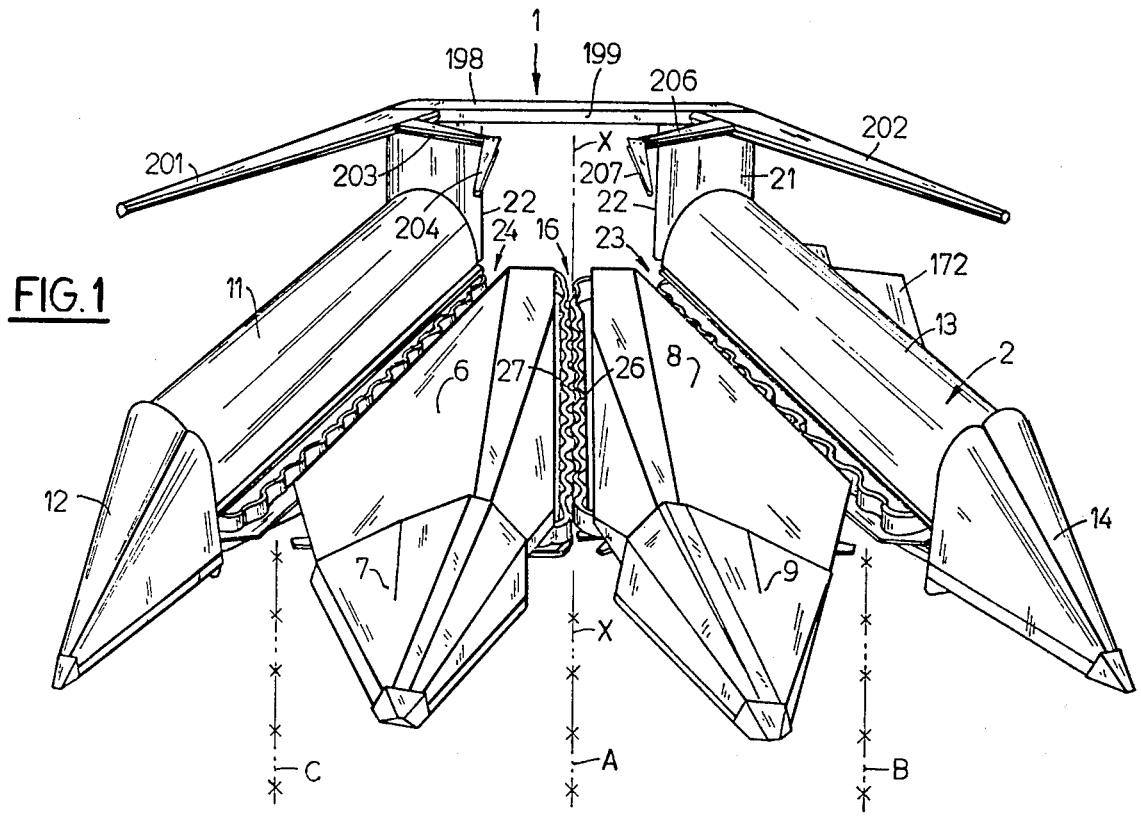
FIG. 1 is a perspective front view of a three row crop feeding attachment incorporating the invention.
Figure 2:
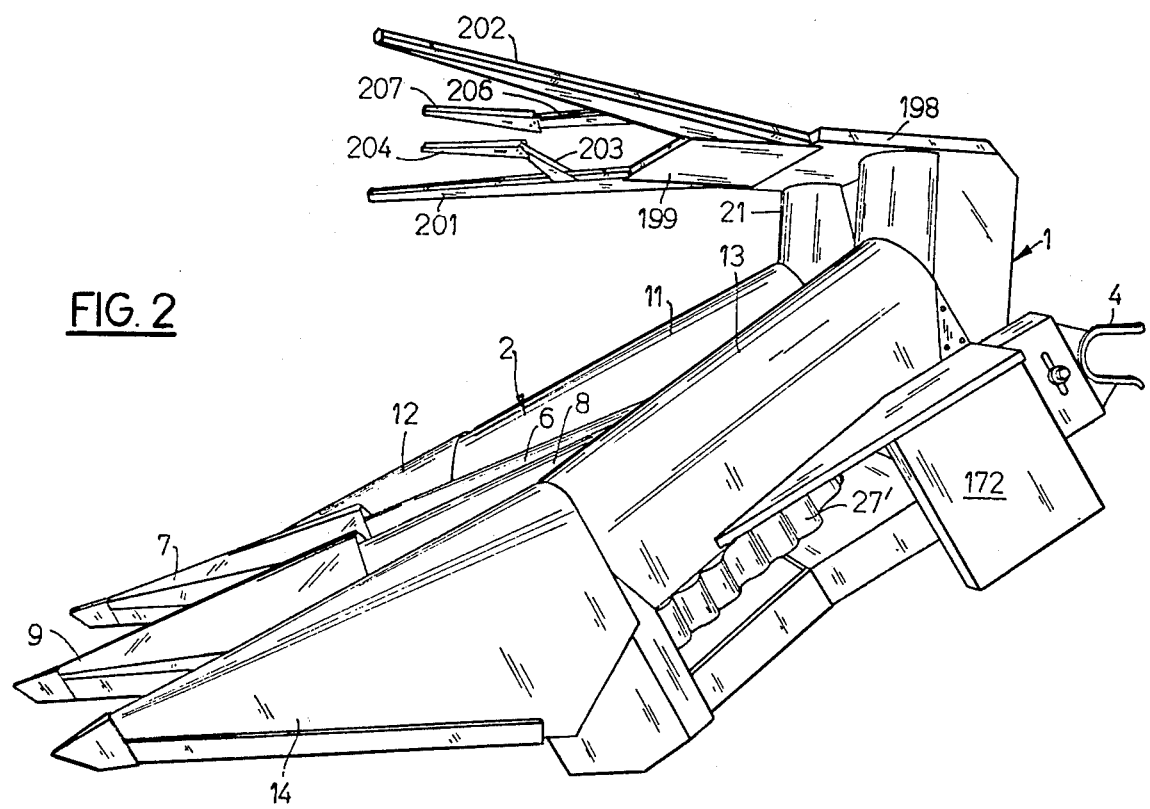
FIG. 2 is a perspective side view of the attachment shown in FIG. 1.
Figure 3:
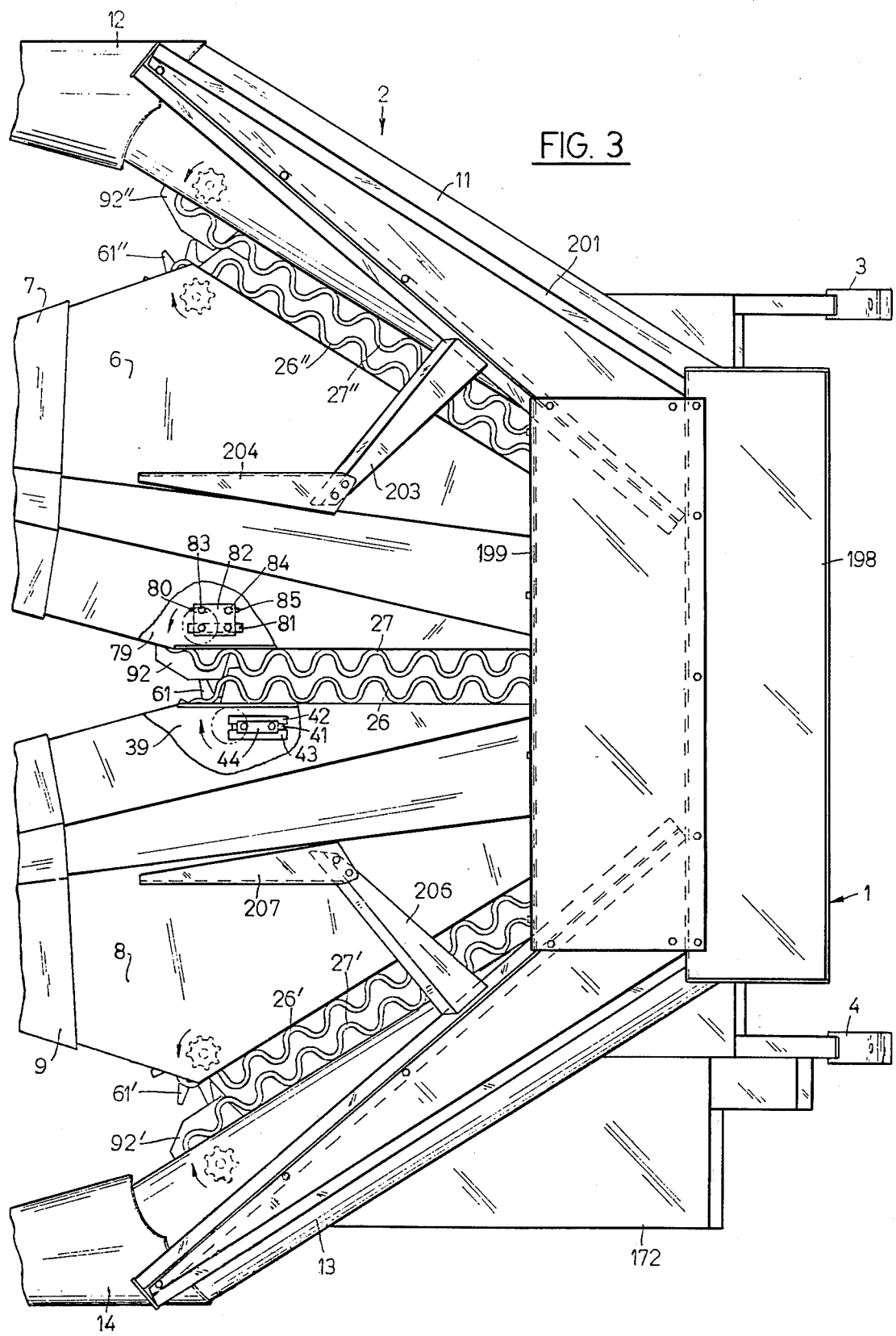
FIG. 3 is an enlarged and partly uncovered top view of the rear part of the attachment shown in FIGS. 1 and 2.

The crop feeding attachment shown in FIGS. 1, 2 and 3 is designed for use with a tractor operated mobile forage chopper, not shown, which may be of any suitable type such as for instance the chopper shown in U.S. Pat. application Ser. No. 323,981, filed on Jan. 15, 1973 by Donald E. Burrough for "Shear Bar for Forage Harvesters or the Like," now U.S. Pat. No. 3,805,660, issued Apr. 23, 1974.

A rigid frame structure of the attachment shown in FIGS. 1-3 comprises an elevated transverse rear section 1 and a forward section 2 which slants forwardly and downwardly from the rear section. A pair of rearwardly projecting mounting brackets 3 and 4 (FIG. 3) on the transverse rear frame section 1 are forked as shown in FIGS. 2 and 8 to provide for detachable connection of the attachment with a chopper unit (not shown) in conventional manner.

A sheet metal super structure on the forward frame section is of the typical three row corn harvester type.

It comprises a wide fender assembly 6 and an attached crop divider 7 at one side of a vertical longitudinal center plane through the attachment which is indicated by the dash-dotted line X—X in FIG. 1; another wide fender assembly 8 and attached crop divider 9 at the other side of the plane X—X; a narrow fender assembly 11 and attached crop divider 12 at the outer side of the wide fender assembly 6; and another narrow fender assembly 13 and attached crop divider 14 at the outer side of the wide fender assembly 8.

A central upwardly and rearwardly extending crop feeding passage 16 is formed between the wide fender assemblies 6 and 8, by a trough structure in the gap between the fender assemblies and comprising side walls 17 and 18 (FIG. 11) and a bottom wall 19. The crop feeding passage 16 is open at both ends and terminates at its forward crop inlet end at a relatively low level above the ground. The rearward elevated crop outlet end of the passage 16 terminates at the transverse rear section 1 of the attachment frame. A sheet metal housing assembly 21 of the rear frame section 1 has an opening 22 for the discharge of crop material from the attachment into the associated chopper unit (not shown).

Another upwardly and rearwardly extending crop feeding passage 24 is formed between the wide fender assembly 6 and the narrow fender assembly 11; and a third upwardly and rearwardly extending crop feeding passage 23 is formed between the wide fender assembly 8 and the narrow fender assembly 13. Each of the feeding passages 23 and 24, like the feeding passage 16, is generally trough shaped and has a lower forward crop inlet end and an upper rearward crop outlet end. The lateral spacings of the crop inlet ends of the feeding passages 23 and 24 from the crop inlet end of the central feeding passage 16 correspond to the spacings of the crop rows to be harvested and which are indicated in FIG. 1 by the reference characters A, B and C. While the central feeding passage 16 extends in the direction of the longitudinal center plane X—X; the lateral feeding passages 23 and 24 converge toward that plane as they extend rearwardly and upwardly from their forward, lowered crop inlet ends. The upper crop outlet ends of the feeding passages 16, 23 and 24 terminate in relatively close proximity to each other at the forward side of the crop discharge opening 22.

A first pair of complementary crop conveyors and associated crop cutting means are operatively mounted on the attachment frame for severing the crop row A from the ground and for moving the severed crop material along the upwardly and rearwardly inclined crop feeding passage 16 into and through the housing structure 21 on the elevated rear section of the attachment frame. Similarly, a second pair and a third pair of complementary crop conveyors and associated crop cutting means are operatively mounted on the attachment frame for severing the crop rows B and C from the ground and for moving the severed crop material along the upwardly and rearwardly inclined feeding passages 23 and 24, respectively, into and through the housing structure 21 on the elevated rear section of the attachment frame.

Figure 4:
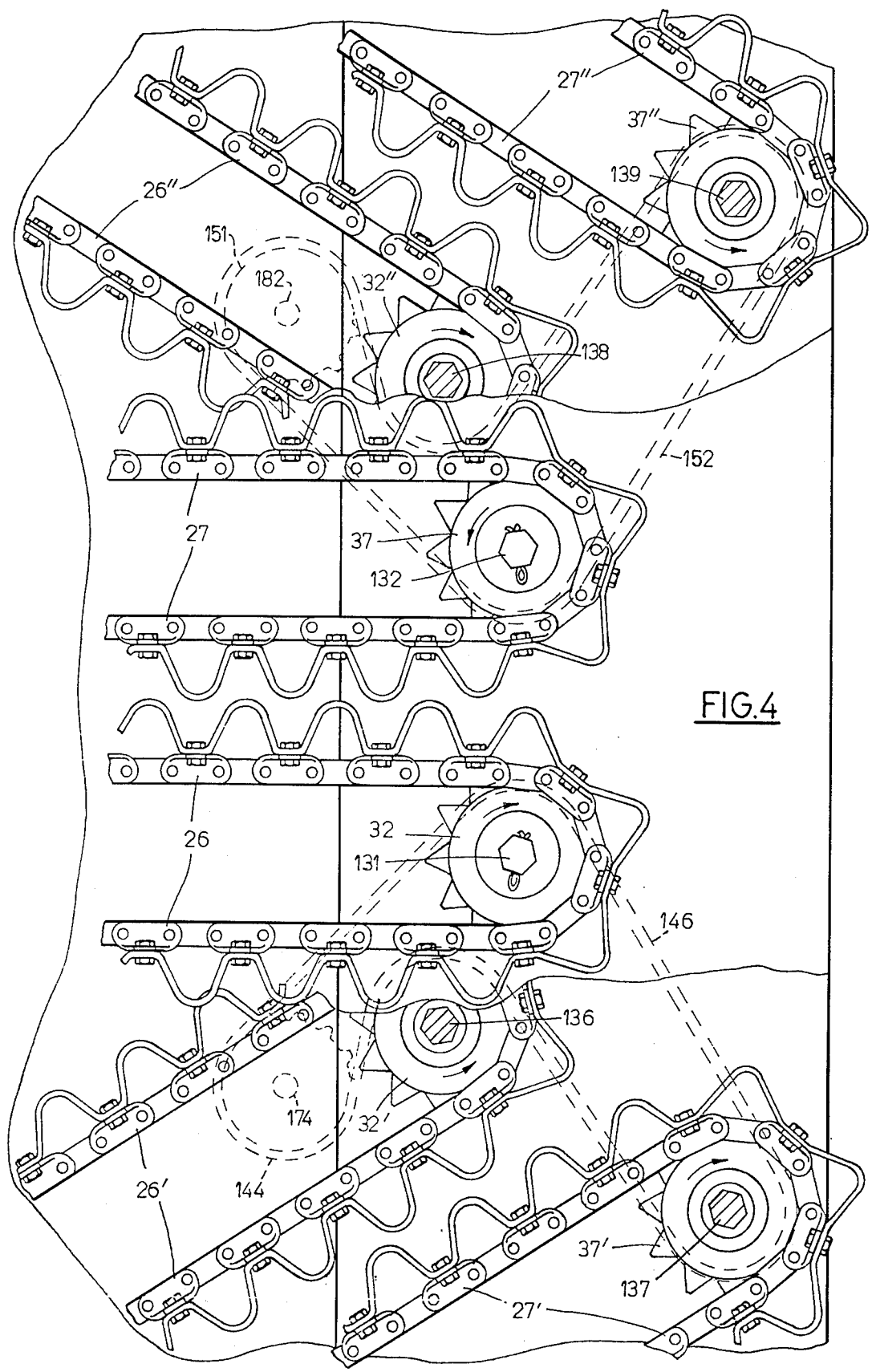
FIG. 4 is an uncovered and enlarged partial top view of the rear ends of three conveyor assemblies shown in FIG. 3.
Figure 5:
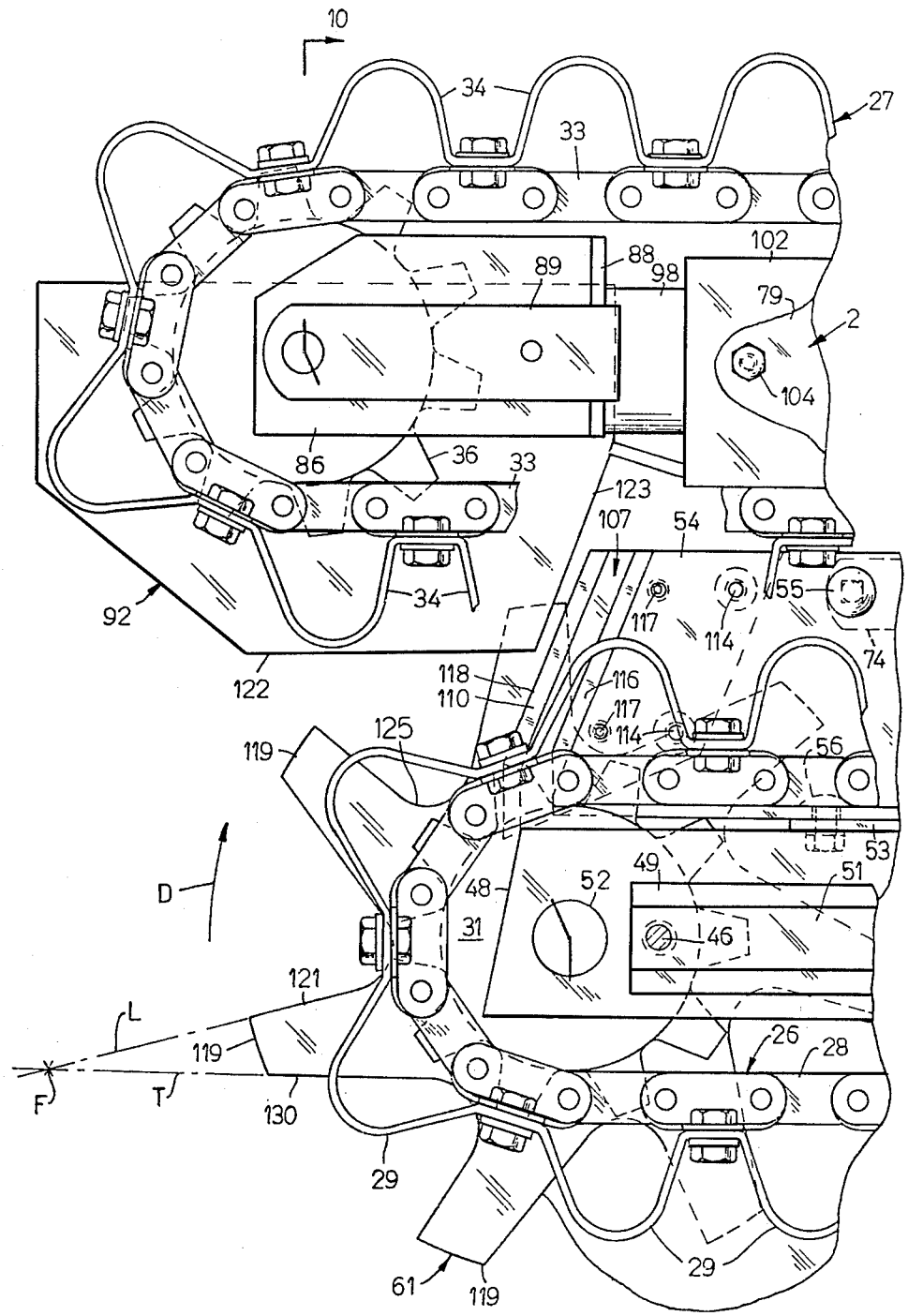
FIG. 5 is an uncovered and enlarged partial top view of the front end of the central conveyor assembly shown in FIG. 3.
Figure 6:
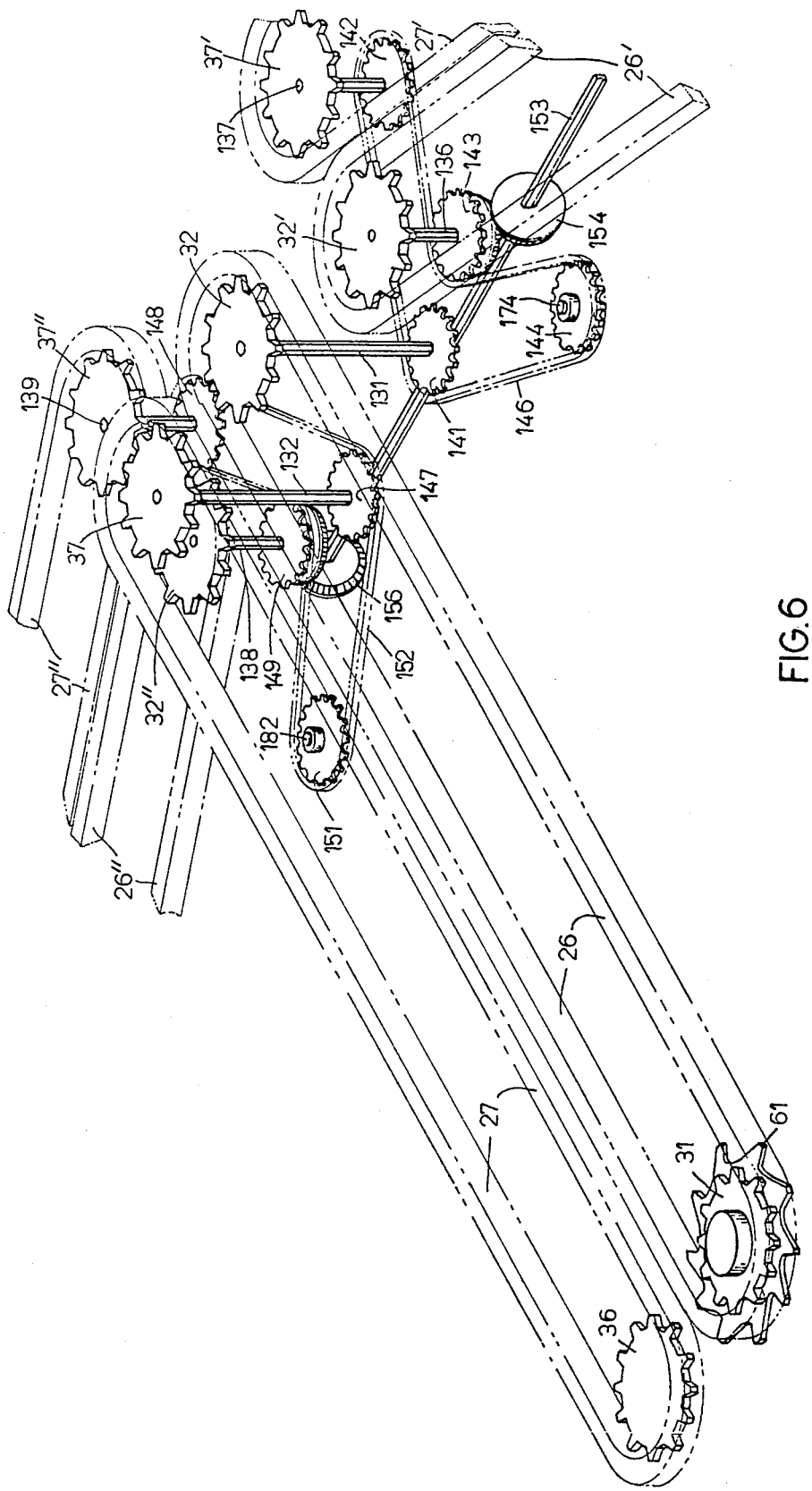
FIG. 6 is a simplified perspective view schematically illustrating the drive mechansim for the three conveyor assemblies shown in FIGS. 1, 3 and 4.
Figure 10:
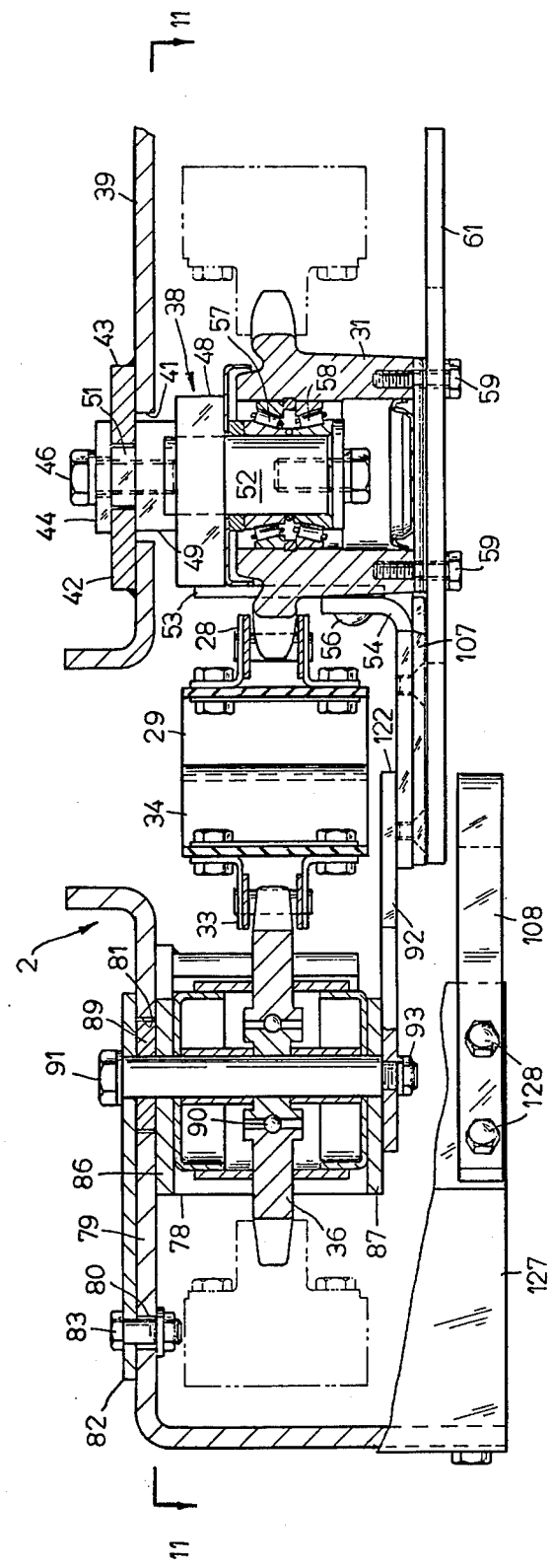
FIG. 10 is a sectional view on line 10—10 in FIG. 5.
Figure 12:
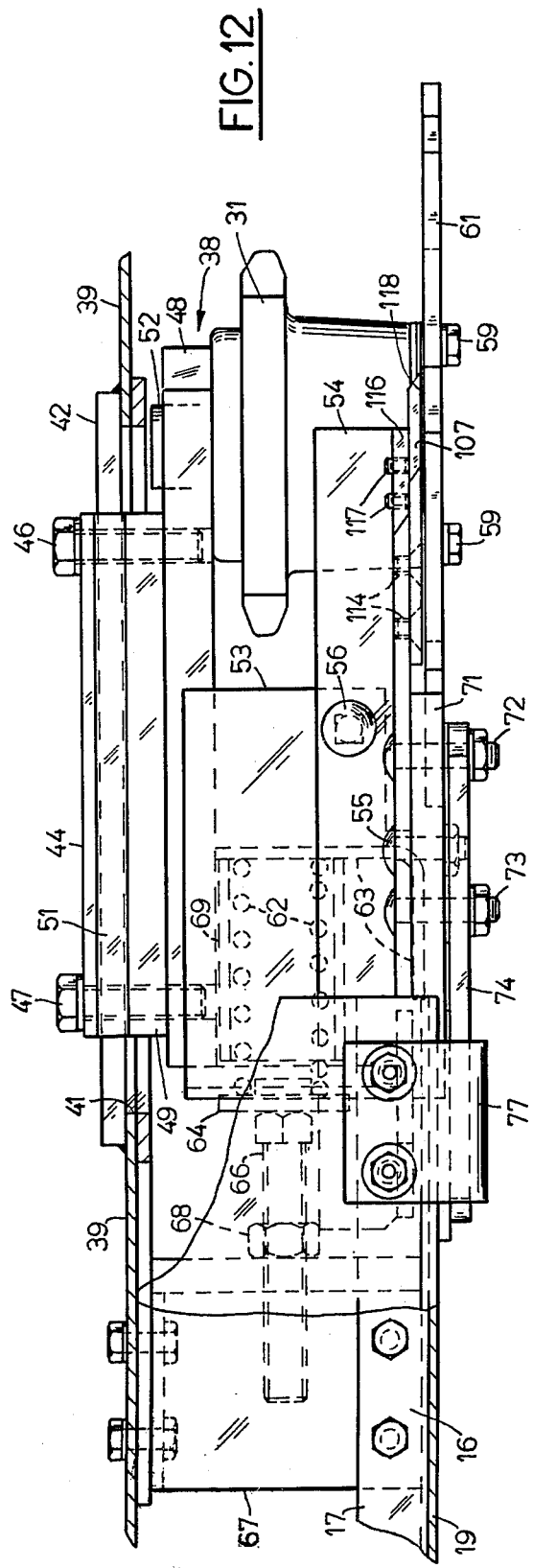
FIG. 12 is a sectional view on line 12—12 in FIG. 11.

Referring first to the crop cutting and conveying means for the crop row A, it will be seen from FIGS. 4 and 5, that a pair of complementary crop conveyors comprising endless belts 26 and 27, respectively, are arranged at opposite sides, respectively, of the longitudinal vertical center plane X—X. The conveyor belt 26 consists of an endless link chain 28 and a continuous series of crop engaging loops of flexible belting 29 which are attached to the outer side of the link chain 28 in conventional manner. The link chain 28 is trained around a front idler sprocket 31 (FIG. 5) and a rear driving sprocket 32 (FIG. 4), the mounting of the idler sprocket 31 being shown in detail by FIGS. 10 and 12, and the mounting of the rear driving sprocket 32 being shown in FIGS. 4 and 6. The opposite conveyor belt 27 similarly consists of an endless link chain 33 and attached loops of flexible belting 34. A front idler sprocket 36 (FIG. 5) for the link chain 33 is mounted on the attachment frame section 2 as shown in FIGS. 10 and 12, and a rear driving sprocket 37 for the chain 33 is mounted on the attachment frame as shown in FIGS. 4 and 6.

The idler sprockets 31 and 36 (FIG. 5) and the driving sprockets 32 and 37 (FIG. 4) are located on the frame section 2 in such positions that relatively adjacent parallel stretches of the conveyor belts 26 and 27 overhang the crop feeding passage 16 from opposite sides in vertically spaced relation to the bottom wall 19 (FIG. 11) thereof. As shown in FIGS. 4, 5 and 10, the pitch diameters of the sprockets 31, 36, 32 and 37, and the radial spacings between the idler sprockets 31, 36 and between the driving sprockets 32, 37 are such that crop material may properly be retained from opposite sides by the loops of resilient beltings 29 and 34 on the link chains 28 and 33, respectively.

In order to keep the conveyor belts 26 and 27 properly tensioned and at the same time accommodate travel of the link chains 28 and 33 around their respective idler and driving sprockets, provisions are made for yieldingly urging the idler sprockets 31 and 36 into forwardly adjusted conveyor belt tensioning positions.

The tensioning mechanism for the conveyor belt 26 comprises a composite support 38 (FIGS. 10 and 12) which is reciprocably mounted on the frame section 2 for back and forth movement longitudinally of the feeding passage 16 and on which the idler sprocket 31 is rotatably mounted for back and forth movement therewith. As may be seen from FIGS. 3, 10 and 12, the frame section 2 includes a top plate 39 below the fender assembly 8, and an elongated opening 41 in the top plate 39 extends fore and aft above the support 38. At the laterally opposite sides of the opening 41 a pair of parallel guide straps 42 and 43 for the support 38 are secured to the top plate 39, and a gap between the relatively opposed parallel edges of the straps 42, 43 is bridged by a rectangular bearing plate 44 from which the support 38 is suspended by means of two cap screws 46 and 47 (FIG. 12).

The support 38 comprises a generally rectangular main plate 48, a rectangular spacer plate 49 secured to the upper face of the main plate 48 and extending lengthwise thereof below the guide straps 42 and 43. A filler plate 51 of slightly greater thickness than the guide straps is slidably fitted into the gap between the latter, and the cap screws 46 and 47 are drawn up to clamp the filler plate 51 between the bearing plate 44 and the spacer plate 49.

Figure 11:
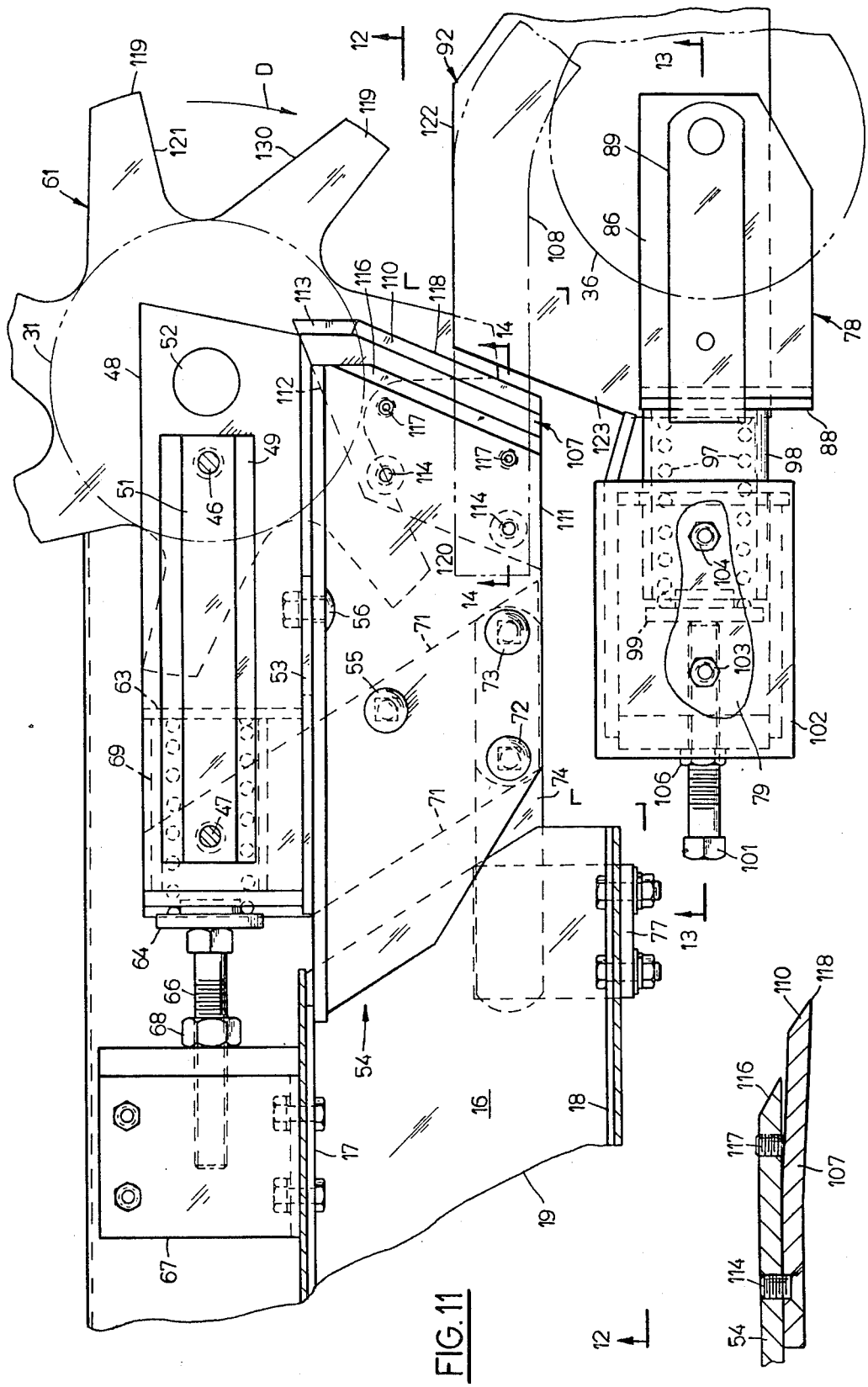
FIG. 11 is a sectional view on line 11—11 in FIG. 10.

The support 38 further includes a stub shaft 52 (FIG. 10) rigidly mounted in and depending from the forward end of the main plate 48; a hanger plate 53 secured to and depending from the main plate 48 substantially in line with the side wall 17 (FIG. 11) of the feeding passage 16; and an angular plate bracket 54 which is connected by a bolt 56 to the lower end of the hanger plate 53 and projects laterally therefrom into space in front of the crop feeding passage 16. As shown in FIG. 11, the rear end of the plate bracket 54 slidingly overlaps the front end of the feeding passage 16.

As shown in FIGS. 10 and 12, the idler sprocket has an elongated hub which encloses a pair of conical roller bearings 57, 58 by means of which the idler sprocket is rotatably supported on the stub shaft 52. Secured to the lower hub end of the idler sprocket 31 by a circular series of cap screws 59 is a star wheel 61 (FIG. 11) which forms part of the crop severing mechanism to be discussed later.

Pressure means for urging the composite support 38 into a forwardly adjusted belt tensioning position are arranged in rear of the sprocket wheel 31 as illustrated by FIGS. 11 and 12. The pressure means comprise a coil spring 62, an L-shaped bracket 63 secured to the underside of the main plate 48 and to the hanger plate 53, and a back-up assembly for the spring 62 in rear of the reciprocable support 38. The back-up assembly comprises a disc 64 carried by the rear end of the spring 62 and a cap screw 66 which is threaded into a bracket 67 on the frame section 2 with its head in contact with the disc 64. A lock nut 68 on the cap screw 66 is drawn up against the bracket 67 to secure the cap screw 66 against turning after it has been turned to the longitudinally adjusted position which places the coil spring 62 into the desired degree of compression between the vertical leg of the bracket 63 and the disc 64.

The spring 62 is surrounded by a tubular support sleeve 69 which is secured to the vertical leg of the L-shaped bracket 63. Underlying and secured by welding to the horizontal leg of the L-shaped bracket 63 (FIG. 15) is a diagonal extension plate 71 which, as shown in FIG. 11, projects obliquely in front of the feeding passage 16 and below the plate bracket 54 to which it is secured by a bolt 55. Secured to the free end of the extension plate 71 by bolts 72 and 73 is a tongue 74 which extends rearwardly under the bottom 19 of the feeding passage 16, a spacer plate 76 (FIG. 15) being interposed between the extension plate 71 and the tongue 74. The free rear end of the tongue 74 slidably cooperates with the bottom wall 19 of guide passage 16 and with an underlying leg of an L-shaped bracket 77 to stabilize the composite support 38 against lateral tilting about is slidable connection with the top plate 39 (FIG. 12) of the frame section 2.

Figure 13:
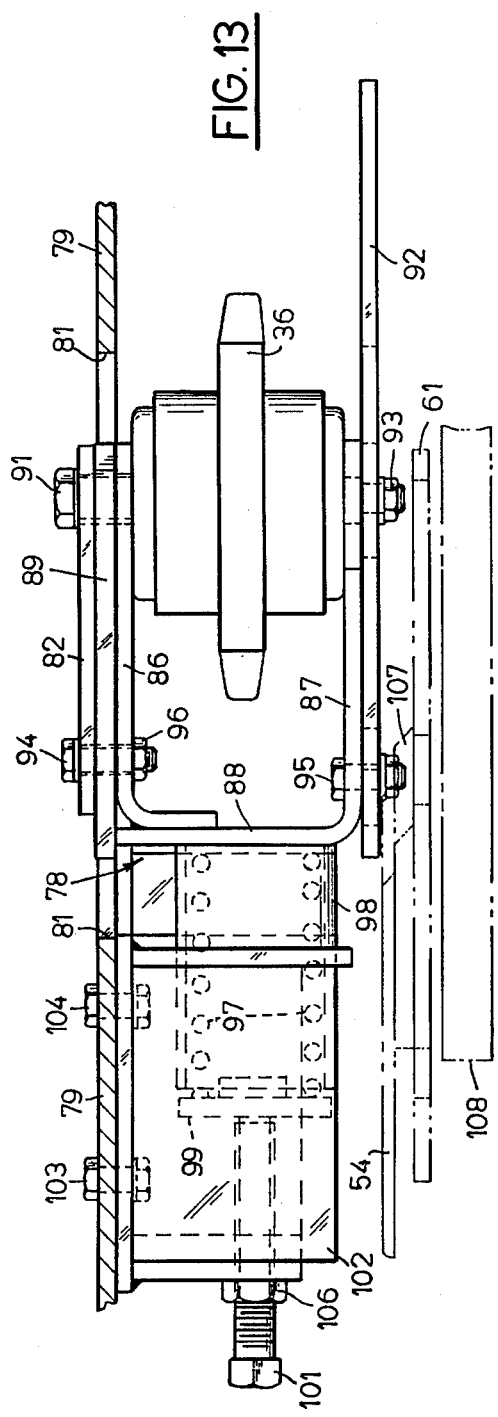
FIG. 13 is a sectional view on line 13—13 in FIG. 11.

As mentioned hereinbefore, provisions are also made for yieldingly urging the idler sprocke 36 for the conveyor belt 27 into a forwardly adjusted belt tensioning position. The tensioning mechanism for the conveyor belt 27 comprises a composite support 78 (FIGS. 10 and 13) which is reciprocably mounted on the frame section 2 for back and forth movement longitudinally of the feeding passage 16. As may be seen from FIGS. 3, 10 and 13, the frame section 2 has a top plate 79 below the fender assembly 6 and an elongated opening 81 in the top plate 79 extends fore and aft above the support 78. A rectangular bearing plate 82 (FIG. 3) in slideable face-to-face engagement with the upper side of the top plate 79 extends across the opening 81 and is guided for movement lengthwise thereof by two bolts 83, 84 which extend through the bearing plate 82 and are guided in slotted openings 80 and 85, respectively, of the top plate 79.

Figure 15:
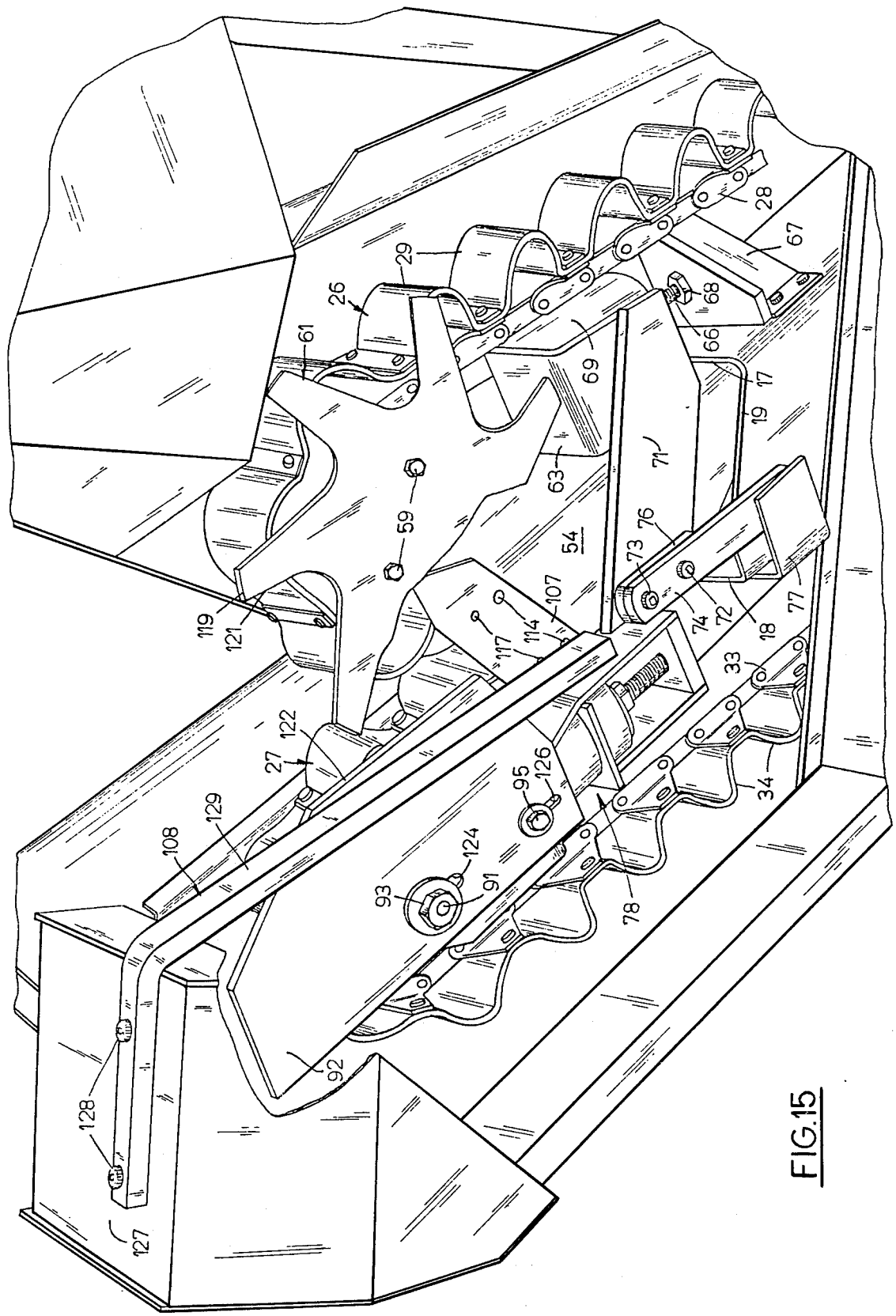
FIG. 15 is an enlarged perspective bottom view of the assembly of parts shown in FIG. 5, the view of FIG. 15 looking upwardly in a generally rearward direction.

The support 78 comprises a fork member having an upper prong 86 extending lengthwise of the opening 81 below the top plate 79, a lower prong 87, and a rearward connecting wall 88 between the upper and lower prongs 86 and 87. A filler strap 89 of slightly greater thickness than the top plate 79 is slidably fitted into the opening 81 for lengthwise back and forth movement therein. A ball bearing 90 for the idler sprocket 36 is mounted between the upper and lower prongs 86 and 87, as shown in FIG. 10, by means of a long bolt 91 which extends through aligned holes in the bearing plate 82, filler strap 89, upper prong 86 and lower prong 87. Below the lower prong 87 (FIG. 10) a plate member 92 is drawn up against the under side of the prong 87 by a nut 93 on the threaded lower end of the bolt 91 and by a cap screw 95 (FIG. 15). The plate member 92 forms a part of the crop severing mechanism to be described later. Tightening of the nut 93 clamps the filler strap 89 between the bearing plate 82 and the upper prong 86 at the forward end of the reciprocable support 78. The bearing plate 82 and the upper prong 86 are further clamped against the filler strap 89 near the rear end of the prong 86 by a cap screw 94 and nut 96 thereon.

Pressure means for urging the composite support 78 and associated idler sprocket 36 into a forwardly adjusted belt tensioning position comprise a coil spring 97 housed within the projecting rearwardly from a tubular sleeve 98 which is secured to the connecting wall 88 between the prongs 86 and 87. A back-up assembly for the coil spring 97 comprises a disc 99 carried by the rear end of the spring 97 and a cap screw 101 which is threaded into a bracket 102 which is secured to the top plate 79 of the frame section 2 by cap screws 103 and 104. The forward end of the cap screw 101 bears against the disc 99, and a lock nut 106 on the cap screw 101 is drawn up against the bracket 102 to secure the cap screw against turning after it has been turned to the longitudinally adjusted position which places the coil spring 97 into the desired degree of compression between the wall 88 and the disc 99.

The cutting mechanism for severing the crop row A (FIG. 1) from the ground comprises four principal components, namely; the already mentioned star wheel 61 and plate member 92 and further a cutting blade 107 and an angular bar 108 (FIG. 15) which forms a crop engaging side member next to the ground. The cutting blade 107, as shown in FIGS. 11 and 15 is secured to the forward end of the plate bracket 54. Its shape is that of a multilated trapezium having parallel front and rear edges 110 and 120, non-parallel side edges 111 and 112 and a short cut back front edge portion 113. The cutting blade 107 is secured to the underside of the bracket 54 by a pair of countersunk flat head screws 114 near the rear edge 120, these screws locating the cutting blade in a position in which a portion thereof adjacent the front edges 110 and 113 projects forwardly from the forwardly and downwardly beveled front edge 116 of the bracket 54. Forwardly from the flat head screws 114 two set screws 117 are threaded into bracket 54 so as to bear downward upon the underlying portion of the blade 107. As shown in FIG. 14, the set screws 117 may be adjusted to deflect the cutting blade more or less away from the bracket 54, the purpose being to raise or lower the front portion of the cutting blade relative to the star wheel 61.

The cutting blade 107 is beveled forwardly and downwardly along its front edge portions 110 and 113 to present a knife edge 118 in the plane of its lower surface. The relative positions of the starwheel 61 and of the cutting blade 107 are such as to place the upper side of the starwheel into face engagement with the under side of the cutting blade.

In the assembled condition of the plate bracket 54 and cutting blade 107 as shown in FIGS. 5 and 11, the cutting edge 118 extends obliquely at a rearward slant across the open end of the guide passage 16. As a result of such oblique positioning of the cutting edge 118, crop material which is crowded against it by the rotating star wheel 61 during the cutting operation, as will be explained more fully hereinbelow, tends to move sidewise away from the center of the star wheel rather than being crowded towards it.

The star wheel 61 (FIG. 5) has the shape of a flat, generally circular disc presenting an annular series of peripherally spaced crop engaging fingers 119. The arrow D in FIG. 5 indicates the direction in which the front sprocket 31 (FIG. 6) of the conveyor belt 26 is rotated in order to advance crop material rearwardly and upwardly along the feed passage 16. The configuration of the crop engaging fingers 119 is such as to provide each finger with a substantially radial edge 121 which is its leading edge during rotation of the star wheel 61 in the direction of arrow D. The trailing edge 130 of each finger 119 extends along a line T which intersects a line L along the leading edge 121 at a focal point F. The trailing edge 130, therefore, converges outwardly relative to the leading edge 121. The fingers 119 are circumferentially spaced from each other by arcuate edge portions 125 between their radially inner ends.

As previously explained, the plate member 92 (FIG.15) is mounted on the front support 78 (FIG. 13) for the idler sprocket 36 independently of the composite front support 38 (FIG. 12) for the idler sprocket 31. The plate member 92 has a crop engaging side edge 122 (FIG. 5) which extends lengthwise of and in front of the crop feeding passage 16, and as shown in FIG. 10, the plate member 92 is located on a level above the level of the cutting blade 107. In addition to the plate member 92, the front section 2 of the attachment frame mounts the angular bar 108 which as shown in FIG. 15 is secured to a wall portion 127 of the frame section 2 by two cap screws 128. The bar 108 has a straight leg which extends in front of the crop feeding passage 16 in the longitudinal direction of the latter within the working range of and below the star wheel 61. A short leg of the bar 108 is slanted outward to guide crop plants toward a crop engaging side edge 129 of the straight leg as the attachment moves forward in the field.

Upon rotation of the star wheel 61 in the direction of arrow D in FIGS. 5 and 11, any crop material within the operating range of the star wheel 61 will be gathered between the leading edges 121 of the star wheel fingers 119, the oblique knife edge 118 of the cutting blade 107, the side edge 122 of the plate 92 and the side edge 129 of the bar 108. The severed crop material advances under the action of the conveyor belts 26 and 27 along the feed passage 16 and is prevented from dropping back upon the rotating star wheel by the overlying horizontal wing of the plate bracket 54 (FIG. 10).

Crop material advanced by the star wheel toward the cutting blade may slide along the edge 122 of the plate member 92 into close proximity of the knife edge 118, but the guide edge 122 terminates at a short distance ahead of the knife edge 118. The rear edge 123 of the plate member 92 extends parallel to the oblique knife edge 118 but on a higher level and at a forward spacing therefrom. The spacing between the cutting edge 118 and the rear edge 123 of the plate member enables uncut crop material which may have hair pinned over the cutting blade to slide over the free end of the cutting blade at its side edge 111, but the rear end of the plate member 92 extends into sufficiently close proximity to the knife edge 118 so that crop material moved against it by the star wheel will be severed from the ground by scissor-like coaction of the star wheel and cutting blade. In other words, the edge portion 122 of the plate member 92 and the star wheel 61 are operatively interrelated so as to guide standing crop material toward the knife edge 118 and sever it from the ground while cut crop material is conveyed rearwardly and upwardly by the conveyor belts 26 and 27 along the crop feeding passage 16.

As shown in FIG. 15, the holes 124 and 126 for mounting the plate member 92 on the idler sprocket wheel support 78 are slotted so that the gap between the rear end of the plate member 92 and the front end of the cutting blade 107 (FIG. 11) may be widened or narrowed as necessary under varying operating conditions.

Standing crop stalks which are engaged by the fingers 119 of the rotating star wheel 61 may tend to slide radially outward along the leading edges 121 of these fingers and out of the operating range of the star wheel. However, such outward displacement of the crop material is limited by the angular bar 108 (FIG. 15) below the star wheel 61.

Referring to FIG. 6, the endless conveyor belts 26 and 27 which are associated with the crop feeding passage 16 (FIG. 1) are schematically indicated in dash-dotted lines, and the idler sprockets 31 and 36 are diagrammatically shown at the forward loops of these belts. The driving sprocket 32 for the conveyor belt 26 is supported by the upper end of a vertical drive shaft 131, and the driving sprocket 37 for the conveyor belt 27 is supported on the same level as the sprocket 32 by the upper end of another vertical drive shaft 132.

FIG. 6 also shows in phantom the rear ends of two lateral pairs of endless conveyor belts, one pair designated 26', 27', and the other pair designated 26", 27". The conveyor belts 26', 27' are operatively associated with the crop feeding passage 23 (FIG. 1) in the same manner as the conveyor belts 26, 27 are associated with the crop feeding passage 16; and the conveyor belts 26", 27" are similarly associated with the crop feeding passage 24 (FIG. 1). The explanations hereinbefore with reference to the conveyor belts 26, 27 analogously apply to the conveyor belts 26', 27' and to the conveyor belts 26", 27". That is, the conveyor belts 26', 27' function to move crop material from the crop row B (FIG. 1) upwardly and rearwardly along the feeding passage 23; and the conveyor belts 26", 27" function to move crop material from the crop row C upwardly and rearwardly along the feeding passage 24. Crop cutting means corresponding to those explained hereinbefore with reference to FIGS. 10–15 are provided to sever the crop rows B and C from the ground. In FIG. 3 star wheels corresponding to the star wheel 61 are designated 61' and 61", and crop engaging plate members corresponding to the plate member 92 are designated 92' and 92".

FIG. 8 shows the mounting of the shaft 132 which carries the drive sprocket 37 for the conveyor belt 27 (FIG. 6) and FIG. 8 also shows the mounting of shafts 138 and 139 which, respectively, carry the drive sprockets 32'' and 37'' for the conveyor belts 26'' and 27''. Upper and lower bearings 157 and 158 (FIG. 8) rotatably support the shaft 132 on upper and lower deck plates 159 and 161, respectively, of the attachment frame. The shaft 138 is similarly supported on the deck plates 159, 161 by bearings 162, 163, and the shaft 139 is rotatably supported on the same deck plates by bearings 164 and 166. These explanations similarly apply to the mounting of the shaft 131 (FIG. 6) which carries the drive sprocket 32 for the conveyor belt 26, and to the mounting of shafts 136 and 137 which respectively carry the drive sprockets 32' and 37' for the conveyor belts 26' and 27'.

In FIG. 6, it will be noted that the supporting shafts 136, 137 for the sprockets 32', 37' and the supporting shafts 138, 139 for the sprockets 32'', 37'' are shorter than the supporting shafts 131, 132 for the sprockets 32, 37. The short shafts 136, 137 place the sprockets 32', 37' in a common plane below the common plane of the sprockets 32, 37; and the short shafts 138, 139 likewise place the sprockets 32'', 37'' in a common plane below the common plane of the sprockets 32, 37. The sprocket 32' is thus located at a sufficiently low level which enables the rear loop of the conveyor belt 26 (FIG. 4) to clear the closely adjacent rear loop of the conveyor belt 26'; and the lowered position of the sprocket 32'' likewise enables the rear loop of the conveyor belt 27 to clear the closely adjacent rear loop of the conveyor belt 26''.

Figure 7:
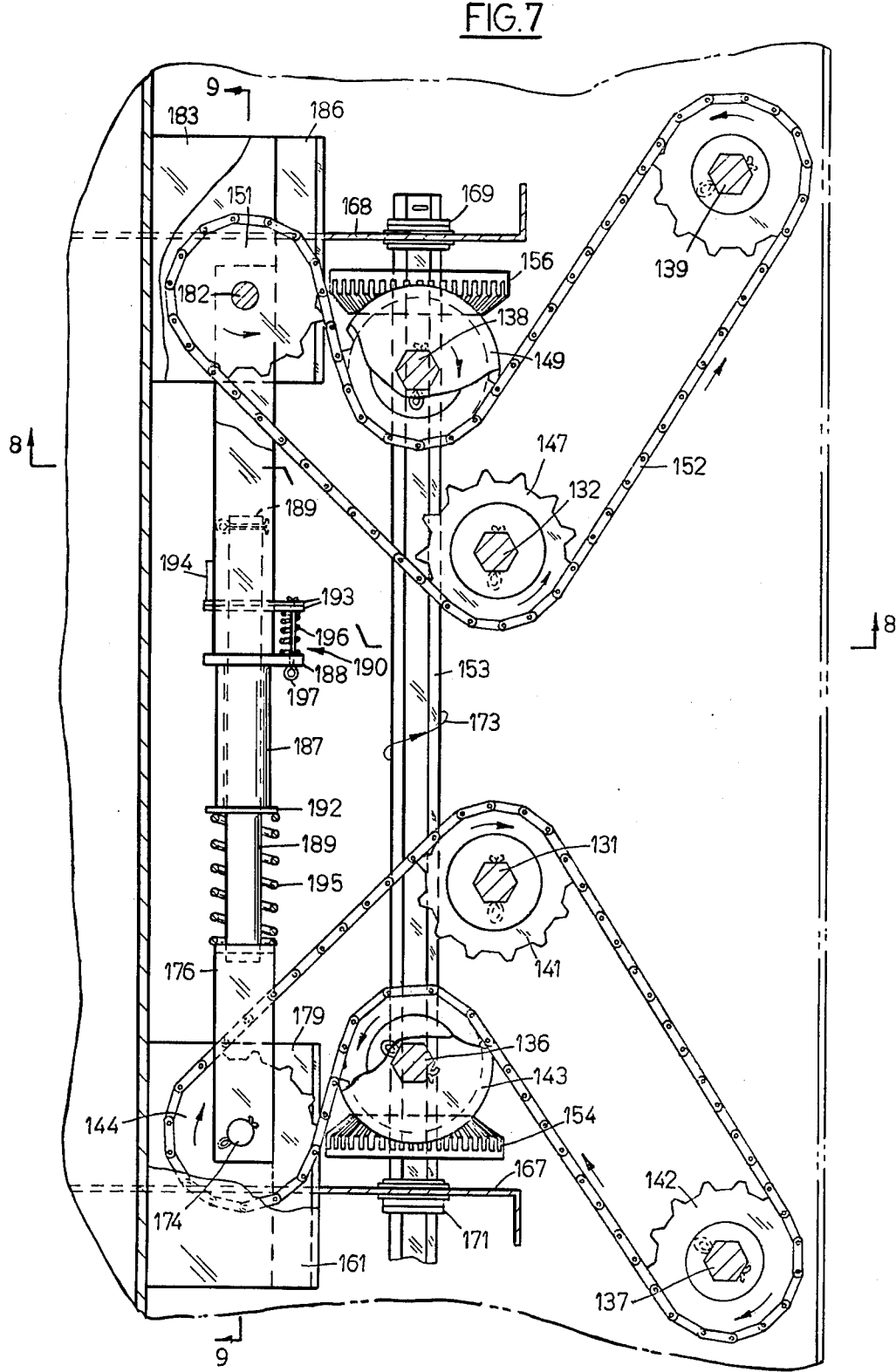
FIG. 7 is an uncovered plan view of the drive mechanism underlying the assembly of parts shown in FIG. 4.

Referring to FIGS. 6 and 7, it will be seen that the drive sprocket 32 (FIG. 6) of the conveyor belt 26 is operatively interconnected with the drive sprockets 32', 37' by first endless chain drive means which comprise a chain sprocket 141 on the shaft 131, a chain sprocket 142 on the shaft 137, a chain sprocket and bevel gear cluster 143 on the shaft 136, and idler sprocket 144 and an endless roller chain 146 which is trained around the sprockets 141, 142, gear cluster 143 and idler sprocket 144.

The drive sprocket 37 (FIG. 6) of the conveyor belt 27 is operatively interconnected with the drive sprockets 32'', 37'' by second endless chain drive means which comprise a chain sprocket 147 on the shaft 132, a chain sprocket 148 on the shaft 139, a chain sprocket and bevel gear cluster 149 on the shaft 138, an idler sprocket 151, and an endless roller chain 152 which is trained around the sprockets 147, 148, gear cluster 149 and idler sprocket 151.

The gear clusters 143 and 149 are connected with drive means which comprise a power input shaft 153, a bevel gear 154 on the shaft 153 in mesh with bevel gear section of the gear cluster 143, and another bevel gear 156 on the shaft 153 in mesh with the bevel gear section of the gear cluster 149. The power input shaft 153 extends transversely of the vertical longitudinal center plane X—X (FIG. 1) in opposite directions and is rotatably supported in reinforcing webs 167, 168 (FIG. 7) of the attachment frame by bearings 169 and 171. A gear box 172 (FIG. 2) at the outer side of the fender assembly 13 is mounted on the attachment frame in line with the shaft 153 and houses the free end of the latter which is broken off in FIGS. 6 and 7. A suitable power source, such as a rotary shaft of the chopper unit (not shown) may be connected to the end of shaft 153 within the gear box 172.

In operation, driving power is transmitted to the shaft 153 so as to cause rotation thereof in the direction of arrow 173 (FIG. 7). The resulting rotation of the bevel gear 154 and gear cluster 143 causes rotation of the drive shaft 136 for the conveyor belt 26' and, over the chain 146, rotation of the drive shafts 131 and 137 for the conveyor belts 26 and 27'. Similarly, rotation of the bevel gear 156 in the direction of arrow 173 (FIG. 7) and the resulting rotation of gear cluster 149 causes rotation of the drive shaft 138 for the conveyor belt 26'' and, over the chain 152, rotation of the drive shafts 132 and 139 for the conveyor belts 27 and 27''. The directions in which the shafts 131, 136, 137 and the shafts 132, 138 and 139 are simultaneously rotated by rotation of the power input shaft in the direction of arrow 173 (FIG. 7) are indicated by arrows in FIG. 4.

It will be seen that the relatively adjacent runs of the conveyors 26 and 27 travel upwardly and rearwardly in the crop feeding passage 16, and that at the same time the relatively adjacent runs of the conveyor belts 26', 27' and the relatively adjacent runs of the conveyor belts 26'', 27'' travel upwardly and rearwardly in the crop feeding passages 23 and 24, respectively. The material of crop row A in which has been severed from the ground by the cutting blade 107 (FIG. 5) and associated parts as described hereinbefore is picked up and carried into the discharge opening 22 by the cooperating endless conveyor belts 26, 27 and at the same time the material of crop rows B and C is similarly severed, picked up and carried into the discharge opening 22 by the cooperating endless conveyor belts 26', 27' and 26'' and 27''.

Referring again to the mechanism for driving the three conveyor belt assemblies 26, 27; 26', 27' and 26'' and 27'', provisions are made to keep the endless roller chains 146, 152 (FIG. 6) for driving these conveyor assemblies under proper operating tension. To that end, a common tensioning mechanism for both chains 146, 152 is operatively interposed between the idler sprockets 144 and 151. As shown in FIGS. 7, 8 and 9, a mounting shaft 174 for the idler sprocket 144 is retained in the open end of a forked bracket 176 which in turn is slideably fitted between the deck plate 161 and an underlying support plate 175 for back and forth movement along a guide strap 178 at the underside of the deck plate 161 and a complementary guide strap 179 on the upper side of the support plate 175.

The sprocket wheel 151 (FIGS. 7 and 9) is mounted in a forked bracket 191 by means of a shaft 182 which is retained in the open end of the bracket 191. Like the forked bracket 176, the bracket 191 is slideably fitted between the deck plate 161 and an underlying support plate 183 for back and forth movement along a guide strap 184 at the underside of the deck plate 161 and a complementary guide strap 186 at the upper side of the support plate 183. The closed end of the forked bracket 191 comprises a hollow stem 187 which is rigidly secured to a cross plate 188 between the prongs of the forked bracket 191. The brackets 176 and 191 are telescopically interconnected along rod 189 which slideably extends through the hollow stem of the bracket 191. A strong coil spring 195 around the rod 189 reacts between the bight of the bracket 176 and a shoulder 192 at the free end of the hollow stem 187.

Under the expanding pressure of the spring 195 the idler sprockets 144 and 151 tend to move apart and as a result the roller chains 146 and 152 are placed under proper operating tension. Due to the operating loads the sprockets 144 and 151 will tend to approach each other which is objectionable because a displacement of the idler sprocket 144 toward the idler sprocket 151 could slacken the roller chain 146 sufficiently so that the chain would run off from its associated drive sprockets. Similarly, a displacement of the idler sprocket 151 toward the idler sprocket 144 could slacken the roller chain 152 sufficiently so that the chain 152 would run off from its associated drive sprockets.

In order to prevent one or the other, or both, roller chains 146 and 152 from running off from their associated drive sprockets under the operating loads, a one-way lock 190 is installed between the forked brackets 176 and 191. The lock comprises a pair of skew washers 193 which loosely embrace the rod 189 between the prongs of the forked bracket 191. An abutment plate 194 for the skew washers is secured to the prongs of the forked bracket 191 at one side of the rod 189, and a coil spring 196 at the opposite side of the rod 189 urges the skew washers 193 into a cocked locking position. The coil spring 196 is supported by a cotter 197 on the cross plate 188 of the bracket 191 and reacts between the latter and the adjacent end portions of the washers 193. The lock 190 may be readily released by pushing the washers 193 manually toward the cross plate 188. While the lock is kept in released condition, the idler sprockets 144 and 154 may be adjusted to slacken the roller chains 146 and 152 for purposes of assembly and disassembly.

In general terms, the herein disclosed multiple row crop harvester comprises first, second and third pairs of complementary crop conveyors as represented for instance by the pair of endless belt conveyors 26, 27; by the pair of endless belt conveyors 26', 27'; and by the pair of endless belt conveyors 26'', 27''. First and second endless chain drives are operatively associated, respectively, with the conveyor belts 26, 26' and 27'; and with the conveyor belts 27, 26'' and 27''; and a rotary power input element, as represented by the shaft 153 (FIG. 6), is operatively connected with both of said chain drives. Each of the endless chain drives comprises a plurality of drive sprockets at fixed radial spacings from each other; a chain tensioning idler, and an endless chain trained about said drive sprockets and tensioning idler. In the illustrated embodiment of the invention, the first endless chain drive includes the chain sprockets 141, 142, 143, the chain tensioning idler 144 and the endless roller chain 146. The second endless chain drive includes the chain sprockets 147, 148, 149, the chain tensioning idler 151 and the endless roller chain 152. The chain tensioning idlers are mounted for radial movement relative to each other, and spring means 195 (FIG. 7) resiliently urge the idlers radially apart. Releasable one-way locking means 190 (FIG. 9) are operatively interposed between the idlers 144, 151 so as to prevent radial movement of the idlers toward each other, but upon release permit radial movement of the idlers toward each other in opposition to the spring means 195.

As shown in FIG. 1, the transverse spacings between the crop rows A, B and C are substantially equal to the transverse spacings between the inlet ends of the crop conveying passages 16, 23 and 24. The lateral conveying passages 23 and 24 converge upwardly and rearwardly toward the central passage 16 which means that the outlet ends of the conveying passages are spaced much more closely than the inlet ends. When the attachment is used for the harvesting of tall crops such as corn, provisions must therefore be made that the crop stalks of the outer rows B and C do not fall over into or across the center row. To that end, the crop feeding attachment as illustrated by FIGS. 1, 2 and 3 is provided with a stalk deflector assembly overlying the fenders 6, 8 and 13.

The deflector assembly comprises a horizontal mounting plate 198 which is supported on top of the rear housing assembly 21. A baffle plate 199 is secured to and extends forwardly from the plate 198, and a pair of outer deflector arms 201 and 202 project forwardly from the opposite ends of the mounting plate 198 and from the baffle plate 199. The outer deflector arm 201 is tapered forwardly and diverges from the vertical longitudinal center plane X—X in generally the same direction as the narrow fender 11. The deflector arm 202 is likewise tapered forwardly and diverges from the plane X—X in generally the same direction as the narrow fender 13.

An inner deflector arm 203 is secured to the inner side of the outer deflector arm 201 at a short forward distance from the front edge of the baffle plate 199. The inner deflector arm 203 is angularly positioned with respect to the outer deflector arm 201 so that the forward portion of the outer deflector arm 201 and the inner deflector arm 203 diverge forwardly and form a crop gathering fork above the crop feeding passage 24. Detachably secured to the free end of the inner deflector arm 203 and extending forwardly therefrom is a forwardly tapering guard arm 204 which, under certain conditions as explained hereinbelow, keeps crop material within the gathering fork presented by the outer and inner deflector arms 201 and 203.

Another crop gathering fork such as formed by the deflector arms 201, 203 above the crop feeding passage 24 is formed above the crop feeding passage 23 by the outer deflector arm 202 and an associated inner deflector arm 206. A guard arm 207 corresponding to the guard arm 204 is detachably secured to the free end of the inner deflector arm 206.

In operation, crop gathering forks 201, 203 and 202, 206 engage the standing crops of rows C and B, respectively, at some distances ahead of the cutting blades at the inlet ends of the passages 24 and 23. Since the arms 201 and 202 are at an angle to the direction of travel, such as 40 degrees, the tops of the crop rows C and B are moved toward the center row A. Shortly after the crop has been cut off and travels up within the feed passages the upper parts of the stalks strike the inner deflector arms 203 and 206 which intersect the outer deflector arms 201 and 202, respectively at points somewhat ahead of the cutting blades, such as about four inches. The intersecting points between the outer and inner deflector arms 201, 203 and 202, 206 are also positioned more closely to the center plane X—X than the cutting blades, such as about seven inches closer; and since the butt ends of the stalks travel within the feed passages toward said center plane the cut off stalks of the rows B and C fall straight forward between the center row and the adjacent uncut outer rows.

The guard arms 204 and 207 prevent the crop in rows B and C from falling into the center row when cutting in a row spacing which is some distance wider, say two to four inches, than the transverse knife spacing of the attachment. When the crop spacing is wider than the knife spacing the star wheels 61' and 61'' lean the stalks of the rows B and C toward the center row A at such an angle that the upper parts of the stalks would miss the inner arms 203, 206 but they are then intercepted by the guard arms 204, 207 and prevented from falling across the center feeding passage 16. When the crop rows A, B and C are entangled, the attachment would best be operated with the guard arms 204, 207 removed from the deflector arms 203, 206.

We claim:

1. In a row crop harvesting apparatus, in combination:
   a frame assembly comprising a forward section presenting a central and two lateral crop feeding passages;
   a pair of complementary crop conveyors for each passage;
   first means including a first endless drive chain for driving the pair of conveyors for one of said lateral passages and for driving one of the conveyors for said central passage;
   second means including a second endless drive chain for driving the pair of conveyors for the other of said lateral passages and for driving the other of the conveyors for said central passage;
   power transmitting means operatively connected with said first and second means to effect driving thereof;
   a pair of idler sprockets mounted on said frame assembly, each idler sprocket being reciprocably movable in a direction transversely of its axis and operatively associated with one of said drive chains; and
   biasing means operatively connected between said pair of reciprocably moveable idler sprockets so as to tension said first and second drive chains.

2. The combination according to claim 1 further comprising releasable one-way lock-up means operatively interposed between said idler sprockets so as to provide for relative movement of said reciprocably moveable idler sprockets in chain tensioning directions and prevent relative movement thereof in chain slackening directions.

3. In a row crop harvesting apparatus, in combination:
   a frame assembly comprising a forward section presenting a central and two lateral crop feeding passages;
   a pair of complementary crop conveyors for each passage, each conveyor comprising a driving sprocket, a driven sprocket and an endless belt supported by said sprockets;
   first means including a first endless drive chain for driving the driving sprockets of the pair of conveyors for one of said lateral passages and for driving the driving sprocket of one of the conveyors for said central passage;
   second means including a second endless drive chain for driving the driving sprockets of the pair of conveyors for the other of said lateral passages and for driving the driving sprocket of the other of the conveyors for said central passage;
   power transmitting means operatively connected with said first and second means to effect driving thereof;
   a pair of idler sprockets mounted on said frame assembly, each idler sprocket being reciprocably movable in a direction transversely of its axis and operatively associated with one of said drive chains; and
   biasing means operatively connected between said pair of reciprocably movable idler sprockets so as to tension first and second drive chains.

4. The combination according to claim 3 wherein said first means and said second means each include a plurality of chain sprockets operatively connected with a respective endless drive chain and wherein each chain sprocket is connected to drive and is coaxial with an associated driving sprocket.

5. The combination according to claim 3 further comprising releasable one-way lock-up means operatively interposed between said reciprocably movable idler sprockets so as to provide for relative movement of said reciprocably movable idler sprockets in chain tensioning directions and prevent relative movement thereof in chain slackening directions.

6. In a row crop harvesting apparatus the combination of a frame assembly comprising an elevated transverse rear section and a forward section presenting a central and two lateral crop feeding passages slanting upwardly and rearwardly toward said rear section; a first pair of complementary crop conveyors operatively associated with said central crop feeding passage; a second pair of complementary crop conveyors operatively associated with the lateral crop feeding passage at one side of said central crop feeding passage; a third pair of complementary crop conveyors operatively associated with the lateral crop feeding passage at the other side of said central crop feeding passage; each of said complementary conveyors comprising an endless belt and a rear driving and front idler sprocket therefor; a first group of chain sprockets connected to drive, respectively, a rear driving sprocket of one of said rear driving sprockets of said first pair of crop conveyors and each of the rear driving sprockets of said second pair of crop conveyors adjacent thereto, each chain sprocket being coaxial with the rear driving sprocket which it drives; a first idler sprocket reciprocably mounted on said rearward frame section for back and forth movement transversely of its axis; a first endless drive chain in cooperative engagement with said first group of chain sprockets and first idler sprocket; a second group of chain sprockets connected to drive, respectively, the other of said rear driving sprockets of said first pair of crop conveyors and each of the rear driving sprockets of said third pair of crop conveyors adjacent thereto, each chain sprocket being coaxial with the rear driving sprocket which it drives; a second idler sprocket reciprocably mounted on said rearward frame section for back and forth movement transversely of its axis; a second endless drive chain in cooperative engagement with said second group of chain sprockets and with said second idler sprocket; spring means operatively interposed between said reciprocably mounted first and second idler sprockets so as to tension said first and second drive chains; and power transmitting means operatively connected with one of said chain sprockets of said first group and with one of said chain sprockets of said second group.

7. The combination of elements set forth in claim 1, and further comprising releasable one-way lock-up means operatively interposed between said reciprocably mounted first and second idler sprockets so as to provide for relative movement of said idler sprockets in chain tensioning directions and prevent relative movement thereof in chain slackening directions.

8. In a row crop harvesting apparatus, in combination:

a frame assembly comprising a rear section and a forward section presenting a central and two lateral crop feeding passages extending rearwardly toward said rear section;

a pair of complementary crop conveyors for each passage, each conveyor comprising an endless belt and a rear driving sprocket and a front idler sprocket;

first means including a first drive chain and a plurality of chain sprockets for driving the pair of conveyors for one of said lateral passages and for driving one of the conveyors for said central passage;

second means including a second drive chain and a plurality of chain sprockets for driving the pair of conveyors for the other of said lateral passages and for driving the other of the conveyors for said central passage, said first means and said second means each including a plurality of chain sprockets operatively connected with a respective endless drive chain and each chain sprocket being connected to drive and coaxial with an associated driving sprocket;

power transmitting means operatively connected with said first and second means to effect driving thereof;

a pair of idler sprockets mounted on said frame assembly, each idler sprocket being reciprocably movable in a direction transversely of its axis and operatively associated with one of said drive chains; and biasing means operatively connected between said pair of reciprocably movable idler sprockets so as to tension said pair of drive chains.

9. The combination according to claim 8 further comprising releasable one-way lock-up means operatively interposed between said reciprocably movable idler sprockets so as to provide for relative movement of said reciprocably movable idler sprockets in chain tensioning directions and prevent relative movement thereof in chain slackening directions.

* * * * *